United States Patent
Petersen (10) Patent No.: US 6,798,111 B1
(45) Date of Patent: Sep. 28, 2004

(54) PLASTIC ENCAPSULATED ELECTRODYNAMIC APPARATUS

(75) Inventor: Christian C. Petersen, Sandwich, MA (US)

(73) Assignee: Petersen Technology Corporation, Bourne, MA (US)

( * ) Notice: Subject to any disclaimer, the term of this patent is extended or adjusted under 35 U.S.C. 154(b) by 0 days.

(21) Appl. No.: 10/712,675

(22) Filed: Nov. 13, 2003

(51) Int. Cl.[7] .................................................. H02K 1/04
(52) U.S. Cl. ........................... 310/254; 310/43; 310/45
(58) Field of Search .................................. 310/254, 258, 310/259, 216–218, 43, 44, 45, 71

(56) References Cited

U.S. PATENT DOCUMENTS

| 3,124,733 | A | * | 3/1964 | Andrews ...................... 318/138 |
| 5,105,115 | A | | 4/1992 | Shinryo et al. ............... 310/258 |
| 5,519,270 | A | | 5/1996 | Yamada et al. ............. 310/67 R |
| 5,536,985 | A | | 7/1996 | Ward et al. ..................... 310/44 |
| 5,659,217 | A | * | 8/1997 | Petersen ................. 310/156.26 |
| 5,677,580 | A | * | 10/1997 | Huang ........................... 310/44 |
| 6,011,339 | A | * | 1/2000 | Kawakami ................... 310/208 |
| 6,132,186 | A | * | 10/2000 | Cooper et al. ........... 417/423.7 |
| 6,232,681 | B1 | | 5/2001 | Johnston et al. .............. 310/44 |
| 6,437,464 | B1 | * | 8/2002 | Neal ............................. 310/43 |
| 6,617,747 | B1 | * | 9/2003 | Petersen ..................... 310/254 |
| 6,707,224 | B1 | * | 3/2004 | Petersen ..................... 310/254 |
| 6,713,933 | B2 | * | 3/2004 | Martin ....................... 310/254 |

* cited by examiner

*Primary Examiner*—Dang Le
(74) *Attorney, Agent, or Firm*—Mueller and Smith, LPA (57) ABSTRACT

Method and apparatus for forming an electrodynamic device such as a motor or generator. The device is formed with an encapsulation structure which is developed by insert molding. A rigid pressed powder stator core and stator backiron subassembly with associated stator core windings is formed. This subassembly is the insert for an insert molding procedure developing an encapsulation structure which mechanically supports the stator structure; provides mechanical support and improved heat dissipation and incorporates integrally formed bearing mounts. With the procedure, substantially lower device costs are realized.

25 Claims, 5 Drawing Sheets

PLASTIC ENCAPSULATED ELECTRODYNAMIC APPARATUS

CROSS-REFERENCE TO RELATED APPLICATIONS

STATEMENT REGARDING FEDERALLY SPONSORED RESEARCH

Not applicable.

BACKGROUND OF THE INVENTION

Investigators in the electric motor arts have been called upon to significantly expand motor technology from its somewhat static status of many decades. Improved motor performance particularly has been called for in such technical venues as computer design and secondary motorized systems carried by vehicles, for example, in the automotive and aircraft fields. With progress in these fields, classically designed electric motors, for example, utilizing brush-based commutation, have been found to be unacceptable or, at best, marginal performers.

From the time of its early formation, the computer industry has employed brushless d.c. motors for its magnetic memory systems. The electric motors initially utilized for these drives were relatively expensive and incorporated a variety of refinements particularly necessitated with the introduction of rotating disc memory. Over the recent past, the computer industry has called for very low profile motors capable of performing in conjunction with very small disc systems and at substantially elevated speeds.

Petersen, in U.S. Pat. No. 4,745,345, entitled "D.C. Motor with Axially Disposed Working Flux Gap", issued May 17, 1988, describes a PM d.c. motor of a brushless variety employing a rotor-stator pole architecture wherein the working flux gap is disposed "axially" with the transfer of flux being in parallel with the axis of rotation of the motor. This "axial" architecture further employs the use of field windings which are simply structured, being supported from stator pole core members, which, in turn, are mounted upon a magnetically permeable base. The windings positioned over the stator pole core members advantageously may be developed upon simple bobbins insertable over the upstanding pole core members. Such axial type motors have exhibited excellent dynamic performance and, ideally, may be designed to assume very small and desirably variable configurations.

Petersen in U.S. Pat. No. 4,949,000, entitled "D.C. Motor", issued Aug. 14, 1990 describes a d.c. motor for computer applications with an axial magnetic architecture wherein the axial forces which are induced by the permanent magnet based rotor are substantially eliminated through the employment of axially polarized rotor magnets in a shear form of flux transfer relationship with the steel core components of the stator poles. The dynamic tangentially directed vector force output (torque) of the resultant motor is highly regular or smooth lending such motor designs to numerous high level technological applications such as computer disc drives which require both design flexibility, volumetric efficiency, low audible noise, and a very smooth torque output.

Petersen et al, in U.S. Pat. No. 4,837,474 entitled "D.C. Motor", issued Jun. 6, 1989, describes a brushless PM d.c. motor in which the permanent magnets thereof are provided as arcuate rings which rotate about a circular locus of core component defining pole assemblies. The paired permanent magnet rings are magnetized in a radial polar sense and interact without back iron in radial fashion with three core components of each pole assembly which include a centrally disposed core component extending within a channel between the magnet pairs and to adjacently inwardly and outwardly disposed core components also interacting with the permanent magnet radially disposed surface. With the arrangement, localized rotor balancing is achieved and, additionally, discrete or localized magnetic circuits are developed with respect to the association of each permanent magnet pair with the pole assembly.

Petersen in U.S. Pat. No. 5,659,217, issued Aug. 19, 1997 and entitled "Permanent Magnet D.C. Motor Having Radially-Disposed Working Flux-Gap" describes a PM d.c. brushless motor which is producible at practical cost levels commensurate with the incorporation of the motors into products intended for the consumer marketplace. These motors exhibit a highly desirable heat dissipation characteristic and provide improved torque output in consequence of a relatively high ratio of the radius from the motor axis to its working gap with respect to the corresponding radius to the motors' outer periphery. The torque performance is achieved with the design even though lower cost or, lower energy product permanent magnets may be employed with the motors. See also: Petersen, U.S. Pat. No. 5,874,796, issued Feb. 23, 1999.

Over the years of development of what may be referred to as the Petersen motor technology, greatly improved motor design flexibility has been realized. Designers of a broad variety of motor driven products including household implements and appliances, tools, pumps, fans and the like as well as more complex systems such as disc drives now are afforded an expanded configuration flexibility utilizing the new brushless motor systems. No longer are such designers limited to the essentially "off-the-shelf" motor varieties as listed in the catalogues of motor manufacturers. Now, motor designs may become integral components of and compliment the product itself in an expanded system design approach.

During the recent past, considerable interest has been manifested by motor designers in the utilization of magnetically "soft" processed ferromagnetic particles in conjunction with pressed powder technology as a substitute for the conventional laminar steel core components of motors. So structured, when utilized as a motor stator core component, the product can exhibit very low eddy current loss which represents a highly desirable feature, particularly as higher motor speeds and resultant core switching speeds are called for. As a further advantage, for example, in the control of cost, the pressed powder assemblies may be net shaped wherein many intermediate manufacturing steps and quality considerations are avoided. Also, tooling costs associated with this pressed powder fabrication are substantially lower as compared with the corresponding tooling required for typical laminated steel fabrication. The desirable net shaping pressing approach provides a resultant structurally rigid magnetic particle structure that is 3-dimensional magnetically (isotropic) and avoids the difficulties encountered in the somewhat two-dimensional magnetic structure world of laminations. See generally U.S. Pat. No. 5,874,796 (supra) and U.S. Pat. No. 6,441,530.

The above-discussed PM D.C. motors achieve their quite efficient and desirable performance in conjunction with a multiphase-based rotational control. This term "multiphase" is intended to mean at least a three step commutation sequence in conjunction with either a unipolar or bipolar stator coil excitation. Identification of these phases in conjunction with rotor position to derive a necessary controlling sequence of phase transitions traditionally has been carried out with two or more rotor position sensors. By contrast, simple, time domain-based multiphase switching has been considered to be unreliable and impractical since the rotation of the rotor varies in terms of speed under load as well as in consequence of a variety of environmental conditions.

The multiphase motors may be described, for instance, by arbitrarily designating the commutation phase sequence of a three-phase motor as: A, B, and C. During those phases, a three-phase unipolar motor control must determine rotor position information for establishing the transitions from phase A to phase B to phase C to phase A as the sequence continues. Such control has been considered to require three rotor position sensors. The most typical of the position sensors are Hall devices and optical sensors. Somewhat costlier control also can be achieved with a back EMF circuit monitoring approach which eliminates all physical position sensors.

Still higher efficiencies are achieved with a three-phase bipolar motor wherein such commutation phase sequencing arbitrarily may be designated as calling for transitions from phase AB to phase AC, to phase BC to phase BA, to phase CA, to phase CB, to phase AB as the sequence continues. Here again, a practical control for such motor architecture has been considered to require three rotor position sensors. Four-phase motors with an arbitrarily designated commutation sequence of A, B, C and D are considered to require two rotor position sensors.

While the stator architecture and pressed powder implementation of the above-discussed motors has not only substantially enhanced their practically and has lowered their structural cost, further, quite substantial cost improvements can be realized by limiting the number of bi-state rotor position sensors required for multiphase motors to only one such sensor. In this regard, currently, the multiple sensors must be positioned in substantially spaced apart locations with respect to the rotor or some slave form of sensing structuring. Thus, the significant cost advantages associated with the integration of the positional sensor and the control circuit in a single chip is lost. The resultant cost factor generally precludes the use of efficient multiphase motors with very low cost applications such as electrical circuit cooling fans. However, as the era of electronic-based systems expands, battery-based power limitations are setting the stage for much higher motor efficiency requirements. Those higher efficiencies only are available with multiphase motors. Higher efficiencies for fan motors may be required, for example, for utilization with a rapidly expanding development of laptop computers. The technology long associated with electronic circuit, low load cooling fans has been somewhat static. Usually implemented as D.C. PM devices, the motors have been structured with a single phase or "two-pulse" architecture in order to retain a capability for operation with a single sensor. Such phasing is highly inefficient, the motors necessarily experiencing zero torque based commutation switching.

In co-pending application for United States patent, Ser. No. 10/706,412 entitled "Multiphase Motors With Single Point Sensing Based Commutation" by Peterson, filed Nov. 12, 2003, a simplified control for multiphase electrically commutated motors is described. The control approach utilizes a single sensor in association with a sensible system to establish reliable phase commutation sequencing. An important result is a significant lowering of the cost of the commutation function of the motors.

Still other motor and generator (collectively referred to as electrodynamic devices) cost considerations are associated with the housings carrying electrical and mechanical components of these devices. These costs are concerned with the precise centering of bearings with respect to stator components. For instance, for some devices, the base metal plates supporting the motor or generator components can represent a predominating cost component of the completed device. Further, where adjunct modalities such as gear trains and the like are incorporated with or within the motors, their assembly in conjunction with motor construction has been observed to dramatically increase overall costs.

BRIEF SUMMARY OF THE INVENTION

The present invention is addressed to electrodynamic apparatus and method of their assembly wherein a completed stator subassembly is employed as the insert in an insert molding-based assembly procedure. With this subassembly approach, a plastic encapsulation structure is developed which provides a mechanically strengthened device, while the procedures for necessary alignment of components is both simplified and improved. The stator subassembly is formed utilizing stator core members and an associated stator backiron which are integrally formed of magnetically soft pressure shaped processed ferromagnetic particles which are generally mutually insulatively associated. Over these stator cores there are positioned bobbin wound stator core windings. These windings may be interconnected in the desired winding scheme with their exit leads or lead extensions (termini) emerging from the encapsulation structure following insert molding, or as shown in the embodiment drawings, each core winding may have it's start and finish leads (exit leads) or extensions which are supported by the bobbins emerge from the encapsulation following insert molding. The thermoplastic encapsulation structure completely surrounds these stator coils and extends radially outwardly from and within the interstices between all of the stator core components. Thus, the plastic itself enhances the dissipation of heat necessarily generated in the stator coil assemblies. Encapsulation further may additionally form the case of the motor or generator. That case, in and of itself may form the outer wall of a utilitarian device such as a power tool or the like. A particular advantage of the encapsulation approach resides in the utilization of pressed powder stator core members and backiron components in a "vertical" format. Because of their cylindrical structural form the insert molding process can create a feature such as gear teeth within the core structure itself yielding a very compact and much lower cost assembly than would otherwise be available with conventional assembly.

Looking at the encapsulation arrangement, bearing mounts are integrally molded with the encapsulation structure and thus, metal bearings may be press fitted within these plastic motor mounts simplifying the assembly process over mounting such devices within metal base or housing components and then assembling those components and the stator component. In the latter regard, metal base components may be eliminated to, in effect, remove what is considered one of the more expensive components of the electrodynamic devices.

In one embodiment, the plastic encapsulation structure also forms the ring gear of a planetary gear head. In this regard, the ring gear is automatically centered with respect to the bearings and the sun gear since the bearing mounts which center the bearings and the sun gear are integral to the molding tool. The result of the above features is an electrodynamic device such as a motor or generator which exhibits improved quality and importantly lower cost.

Other objects of the invention will, in part, be obvious and will, in part, appear here and after. The invention, accordingly, comprises the method and apparatus possessing the construction, combination of elements, arrangement of parts, and steps which are exemplified in the following detailed description.

For a fuller understanding of the nature and objects of the invention, reference should be made to the following detailed description taken in conjunction with the accompanying drawings.

DETAILED DESCRIPTION OF THE INVENTION

In the discourse to follow, the electrodynamic apparatus according to the invention initially is described as a motor embodiment, whereupon the techniques of its insertion mold based formation are discussed. The resultant product is a motor which is fabricated at significant cost reduction and which enjoys enhanced mechanical strength in consequence of the union of a rigid pressed powdered metal stator with a thermoplastic encapsulation structure. That structure which includes the stator winding assembly, provides improved heat dissipation at the region of the stator windings.

Figure 1:
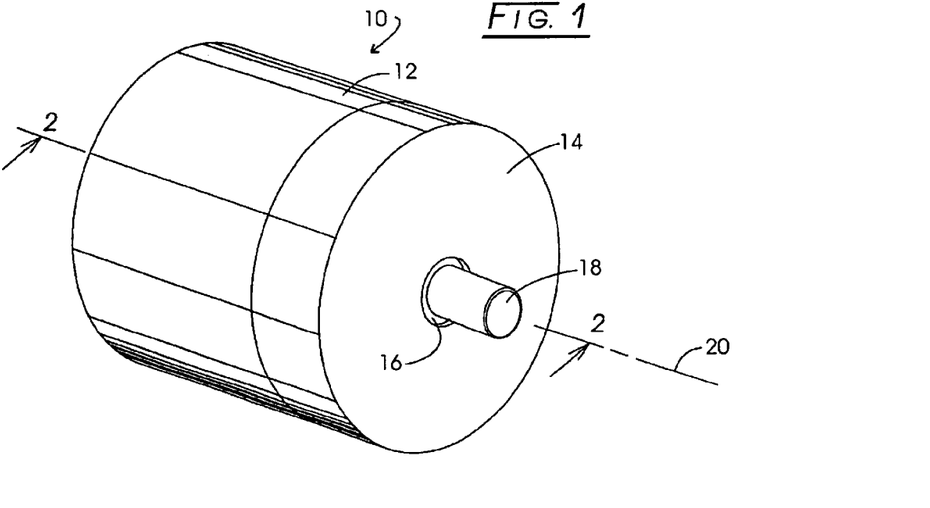
FIG. 1 is a perspective view of a motor embodiment of the invention.

Looking to FIG. 1, a d.c. PM motor configured according to the precepts of the invention is represented generally at 10. Motor 10 is formed with an outer cylindrical case 12 formed in the course of encapsulation or insert molding which will be seen to evolve an encapsulation structure. Adhered to the cylindrical case 12 is a polymeric cap 14 having a bushing form of bearing 16 supported therein which, in turn, supports a motor output shaft 18 here seen to be axially aligned with the axis 20 of the motor 10.

Figure 2:
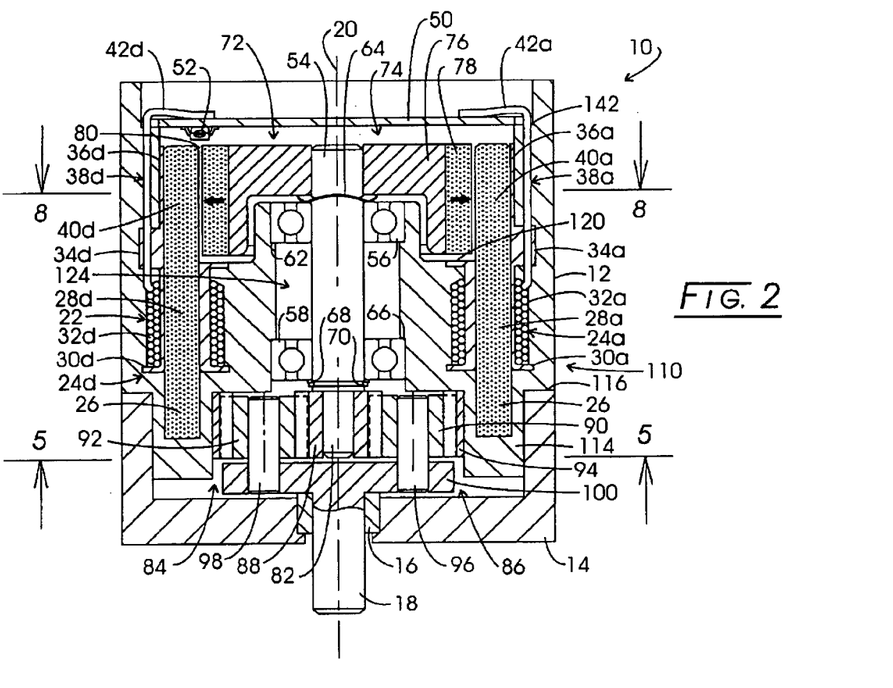
FIG. 2 is a sectional view taken through the plane 2—2 shown in FIG. 1.

Looking to FIG. 2, the motor 10 is seen in section as being configured with a mold insert or subassembly represented generally at 22. Looking additionally to FIG. 3, the subassembly 22 includes six spaced apart stator poles or core members identified generally in FIG. 3 at 24a–24f. Stator cores 24a–24f are formed of a material composed of magnetically soft pressure shaped processed ferromagnetic particles which are generally mutually insulatively associated. These materials such as Somaloy 550 are sometimes referred to as involving soft magnetic composite technology and are marketed, inter alia, by North American Hoganas, Inc., of Hollsopple, Pa. Cores 24a–24f are formed integrally with a ring-shaped backiron shown at 26. Slidably positioned over the winding core portions 28a–28f of respective stator cores 24a–24f are polymeric, electrically insulative bobbins 30a–30f.

Figure 3:
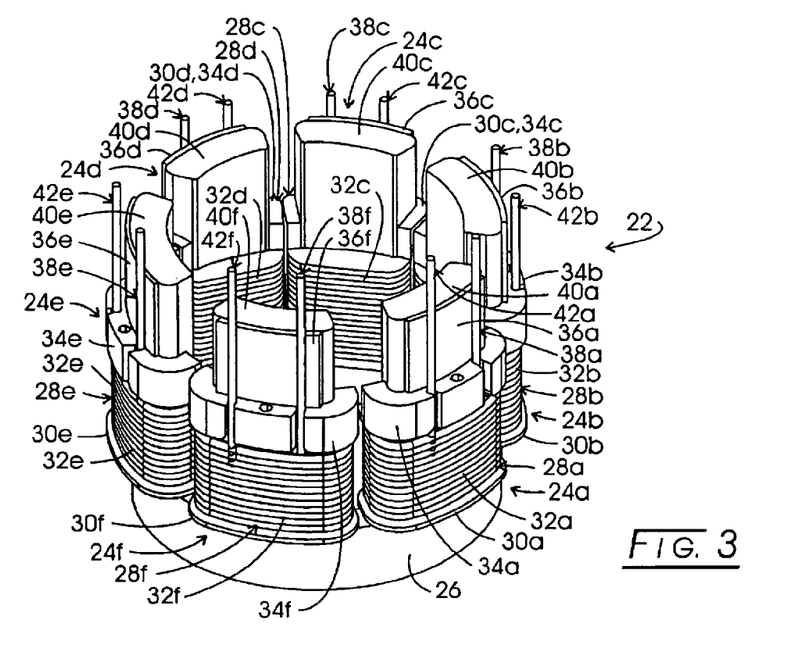
FIG. 3 is a perspective view of a mold insert subassembly for fabricating the motor of FIG. 1.

Each bobbin 30a–30f supports a stator coil winding generally adjacent the winding core portions 28a–28f as revealed respectively at 32a–32f. Above these windings the bobbins are configured with an integrally formed radially outwardly disposed lead supporting shoulder as shown at 34a–34f. Supported axially upwardly from these shoulders 34a–34f are integrally formed electrically insulative lead shields 36a–36f. Shields 36a–36f electrically isolate paired start and finish leads represented generally at 38a–38f. Leads 38a–38f are seen in the subassembly of FIG. 3 as extending axially on the outward side of the stator core members from the lead supporting shoulders 34a–34g to lead termini represented generally at 42a–42f. As seen in FIG. 2, as the motor 10 is assembled, the lead termini 42a–42f are bent over to contact a circular control platform 50. At the platform 50, the termini 42a–42f are coupled with a control circuit. While dual leads are shown extending from each coil, these windings may be mutually interconnected such that only two, three or four leads or lead extensions (depending on motor winding scheme) are coupled to the circuit at platform 50. Additionally shown supported from the underside of platform 50 is a sensing circuit or device 52 employed for multiphase commutation of the motor 10. Such circuits are described, for example, in the above-identified application for United States patent Ser. No. 10/706,412.

FIG. 2 further reveals that motor 10 includes a shaft or drive shaft 54 disposed about axis 20 and supported by ball bearings 56 and 58. Bearing 56 is pressed upon a shoulder-configured bearing mount 62 and a loading force is applied by a wavy washer 64. Bearing 58 is positioned against a shoulder-configured bearing mount 66. The loading and retention of both bearings is completed by the combination of a washer 68 and E-ring 70.

Shaft 54 extends upwardly into a rotor operational region represented generally at 72 and is connected to a rotor represented generally at 74 configured with a rotor backiron 76 and a radial magnet 78 with a sequence of four magnetic regions of alternating polarity. The outwardly disposed surface of rotor magnet 78 is spaced from the radially inwardly facing surfaces of stator core flux interaction regions 40a–40f to define a working gap 80.

Figure 5:
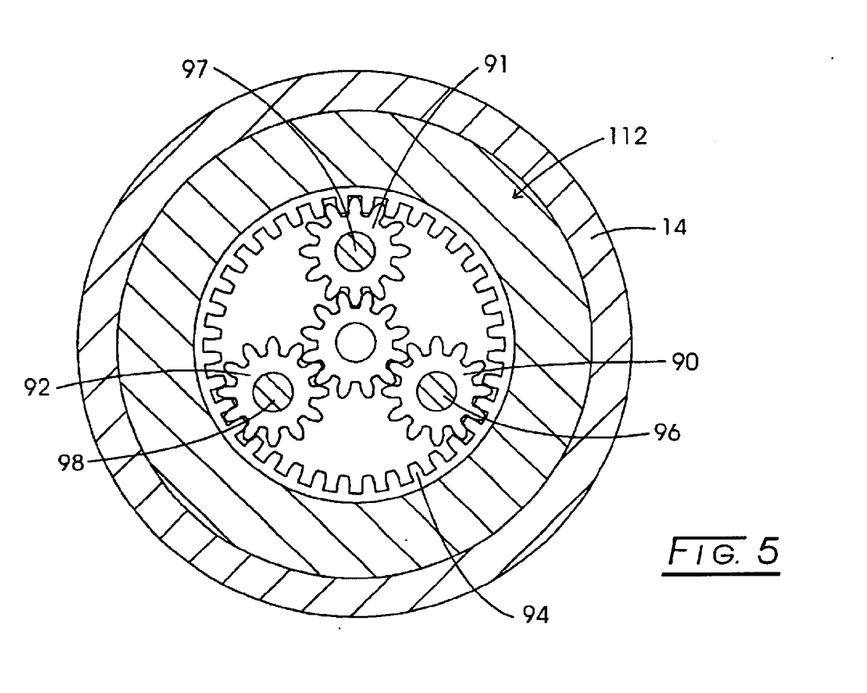
FIG. 5 is a sectional view taken through the plane 5—5 shown in FIG. 2.

Shaft 54 extends along axis 20 in the opposite direction to a stepped down shaft portion 82 which extends into a gearhead operational region represented generally at 84 which is configured as a gearhead mount within which a planetary gearhead represented generally at 86 is mounted. In this regard, shaft portion 82 is coupled in driving relationship with a sun gear 88. Looking additionally to FIG. 5, gear 88 is seen to be coupled in driving relationship with three planet gears 90–92 which, in turn, are engaged with a ring gear 94. Planet gears 90–92 are mounted upon respective short metal shafts 96–98 which, in turn, are mounted within a rotatable platform 100 connected with or formed integrally with output shaft 18. As noted above, shaft 18 is rotatably mounted within bushing 16 of motor cap 14. Bushing 16 may be formed, for example of bronze and alternately may be provided as a ball bearing. Typically, the sun gear 88 will be formed of a metal, while the planet and ring gears will be fashioned of a plastic material. Such gearheads may be located within the encircled region of the wound stator assembly as shown in FIG. 2.

An alternate form of a planetary gearhead may also be incorporated. In that form the planet gears are fixed in position riding on fixed shafts that are mounted in the encapsulated structure at the gearhead mount region and the ring gear rotates being coupled directly to the output shaft.

Also, it is obvious that multi-stage planetary gearheads may be incorporated within the encapsulation structure.

Motor 10 is formed or assembled employing an insert molding technique utilizing insert mold tools which pull apart and join together along the axis 20. When the mold tools are joined together for molding, a molten thermoplastic material is injected or "shot" into the tool die cavity containing the wound stator assembly to create a plastic encapsulation structure. The insert for this procedure is the sub-assembly represented generally at 22 in FIG. 3 also possibly along with a removable insert that locates and seals the exit wires. In keeping with conventional insert molding techniques, the insert 22 must be properly radially "located" within the die as well as properly axially "located". These procedures are facilitated by the utilization of a quite rigid pressed powder stator core and backiron component. While a variety of plastics may be employed for this molding procedure, in general, a member of the nylon family may be employed. The selection of a particular plastic will be determined with regard to whether a gearhead is employed and, in turn, whether a component of the gearhead such as ring gear 94 is to be incorporated with the process. Additionally, the heat dissipation characteristics of the plastic should be considered. In general, nylon is the generic term for any long-chain synthetic polymeric amide which has recurring amide groups as an integral part of the main polymer chain. The material is characterized by high strength, elasticity, and resistance to water and chemicals. Such plastics are marketed, for instance, by DuPont Co., DuPont Engineering Polymers, of Wilmington, Del., 19880-0713.

Figure 4:
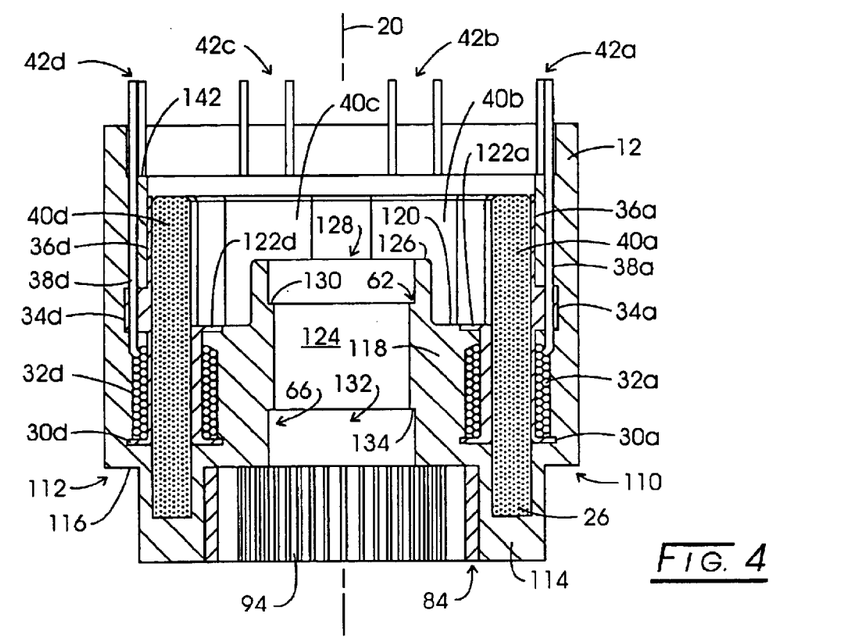
FIG. 4 is a sectional view of an encapsulated stator structure.
Figure 6:
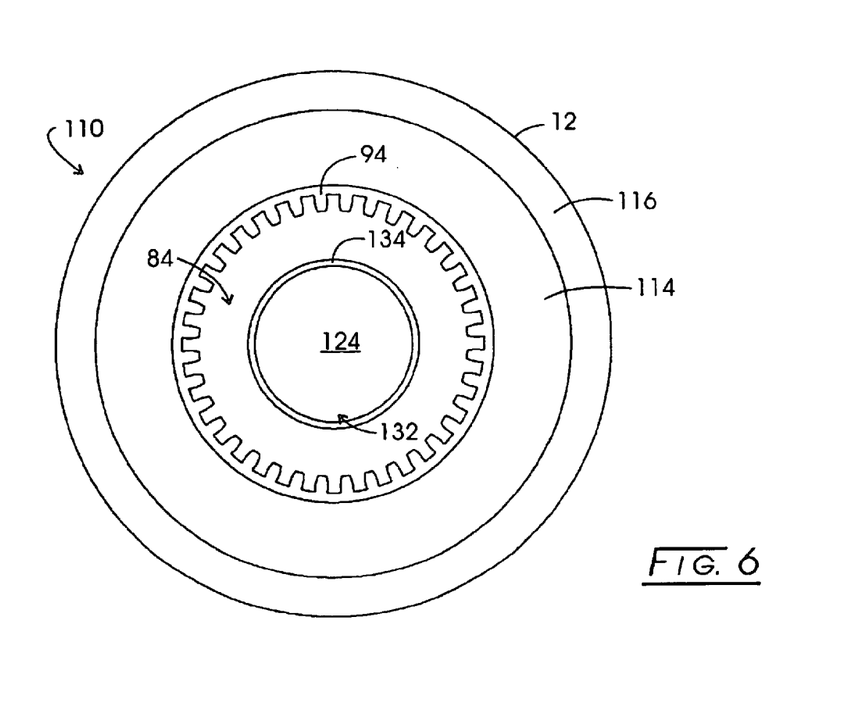
FIG. 6 is a bottom view of the structure of FIG. 4.
Figure 7:
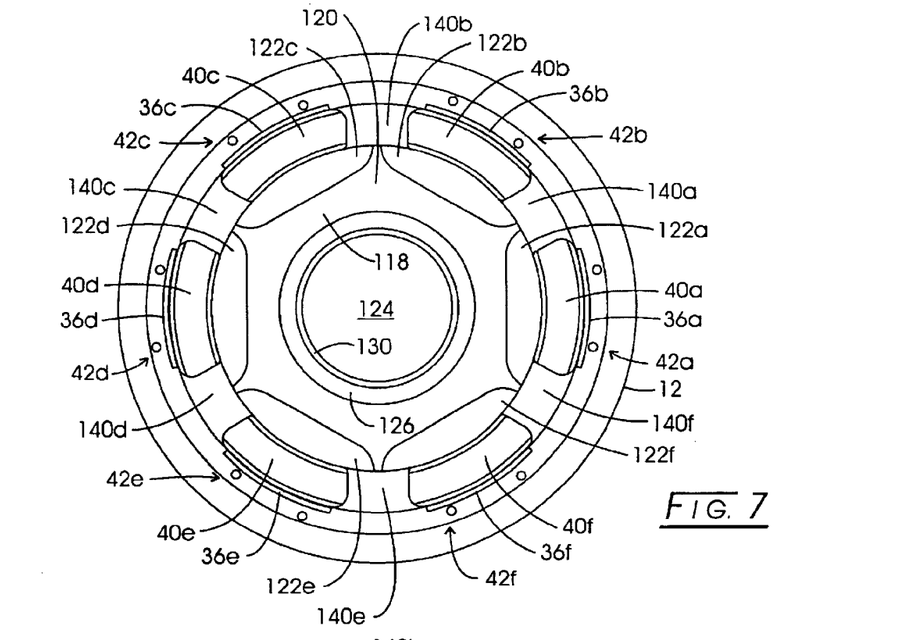
FIG. 7 is a top view of the structure of FIG. 4.

Following curing of the thermoplastic, an encapsulated stator structure will have been formed. Looking to FIG. 4, this encapsulated stator structure is represented generally at 110. Structure 110, in addition to incorporating the upstanding stator insert 22 (FIG. 3) will contain the plastic encapsulation structure represented generally at 112. FIG. 6 is a bottom view of component 110 and looking to FIGS. 4 and 5, it may be observed that structure 112 includes an integrally formed lower ring-shaped portion 114 which surrounds the backiron region 26 of the stator core assembly and further defines generally cylindrically shaped gearhead operational region or gearhead mount 84. For the instant embodiment, ring gear 94 is integrally formed within plastic lower region 114. Region 114 extends upwardly to define an annular shoulder 116 which functions to abut against the upwardly depending edge of cap 14. From lower region 114, the encapsulation structure extends about the spaced apart bobbins 30*a*–30*f* and their associated coil windings 32*a*–32*f* as well as the spaces between them. This intermediate region is represented at 118 in FIGS. 4 and 7. Note that region 118 extends initially to level 120 (FIG. 4) which is generally coplanar with the radially inwardly depending flanged components 122*a*–122*f* (FIG. 7) of respective bobbins 30*a*–30*f*. Region 118 also defines a central opening region represented generally at 124 which is symmetrically disposed about axis 20 and extends to communication with lower gearhead mount region 84. From level 120 region 118 extends to upper annulus-shaped level 126 where it defines an upper bearing mount represented generally at 128 and configured with an annular bearing support shoulder or ridge 130. Central opening 124 further is configured to define a lower bearing mount represented generally at 132 and configured with an upwardly disposed annular shaped shoulder or ridge 134 (see additionally FIG. 6). FIGS. 4 and 7 further reveal that the encapsulation structure extends outwardly from the stator windings to define case portion 12 as seen additionally in FIGS. 1, 6 and 7.

Figure 8:
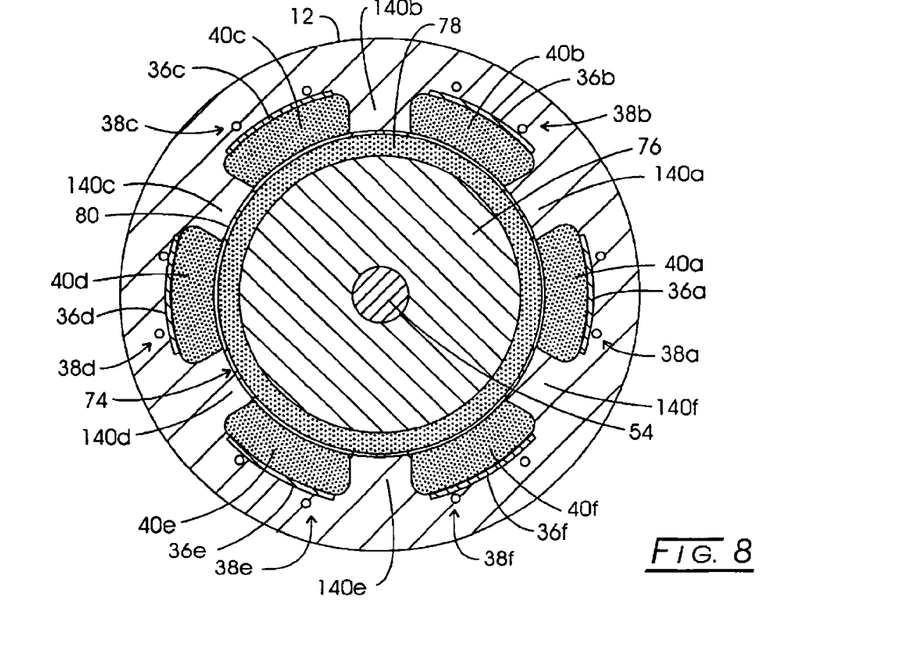
FIG. 8 is a sectional view taken through the plane 8—8 shown in FIG. 2.

FIGS. 4 and 8 reveal that the encapsulation structure extends upwardly to define the case 12 radially outwardly from the stator structure. Note in these figures that the start and finish leads 38*a*–38*f* are fully encapsulated radially outwardly from the stator structure. FIG. 8 further reveals that the upwardly disposed core flux interaction regions 40*a*–40*f* are laterally supported by the radially inwardly depending stator core interstitial regions 140*a*–140*f*. FIG. 4 illustrates that the encapsulation structure extends as a wall structure or case upwardly above the core interactions portions 40*a*–40*f* to define an annular ledge or control platform support 142. As described in connection with FIG. 2, the support 142 functions to support control platform 50.

The general procedure for assembling motor 10 commences with the formation of the insert 22 as described in connection with FIG. 3. Insert 22 is located within an insertion die or tool. Its radial alignment may be referenced, for example, by the radially inwardly depending surfaces of core flux interaction portions 40*a*–40*f*. Axial locating may, for example, be carried out with tool mounted pins or the like. The insertion tool provides for shutting off against the radially inwardly facing surfaces of the core flux interaction portions to define the noted rotor operational region. Similarly, the central opening region 124 and gear mount region 84 are shut off as the oppositely disposed tool components are closed. Depending on tool design, an additional removable insert which locates the coil winding termini and shuts off plastic leakage around those exit wires could be included with the stator insert 22. Plastic then is shot into the die. Upon curing the oppositely disposed tool components are parted and the removable insert, if included, is removed from the top portion of the encapsulated stator. The result is the formation of the encapsulated stator structure represented in general at 110 in FIG. 4. Bearing 56 is then press fitted into bearing mount 62 and bearing 58 is press fitted into bearing mount 66. Rotor assembly 74 containing shaft 54 is installed within bearings 56 and 58 and wavy washer 64 is installed as well as washer 68 and E-ring 70. Sun gear 88 is affixed to stepped down shaft portion 82. Planet gears 90–92 are installed upon the platform 100 incorporating output shaft 18. Cap 14 then is installed with output shaft 18 extending through bushing or bearing 16. In general, the cap 14 is adhesively attached to the encapsulation structure.

Figure 9:
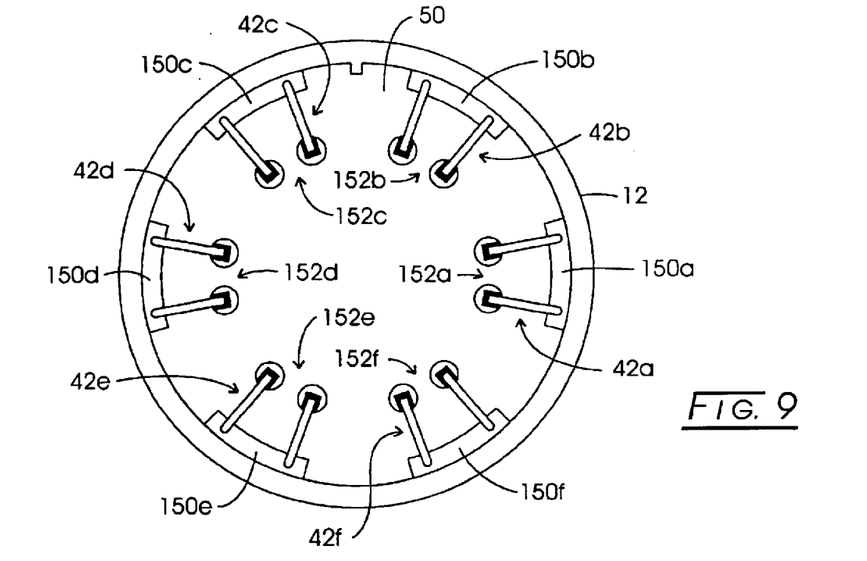
FIG. 9 is a top view of the motor shown in FIG. 2.

Looking to FIGS. 2 and 9, support platform 50 and its associated circuit with sensor component 52 then is installed. FIG. 9 reveals that the platform is configured having radially outwardly disposed openings or notches 150*a*–150*f* which receive respective start and finish lead termini 42*a*–42*f*. Termini 42*a*–42*f* are then electrically coupled to respective flat surface terminals represented generally at 152*a*–152*f*.

Figure 10:
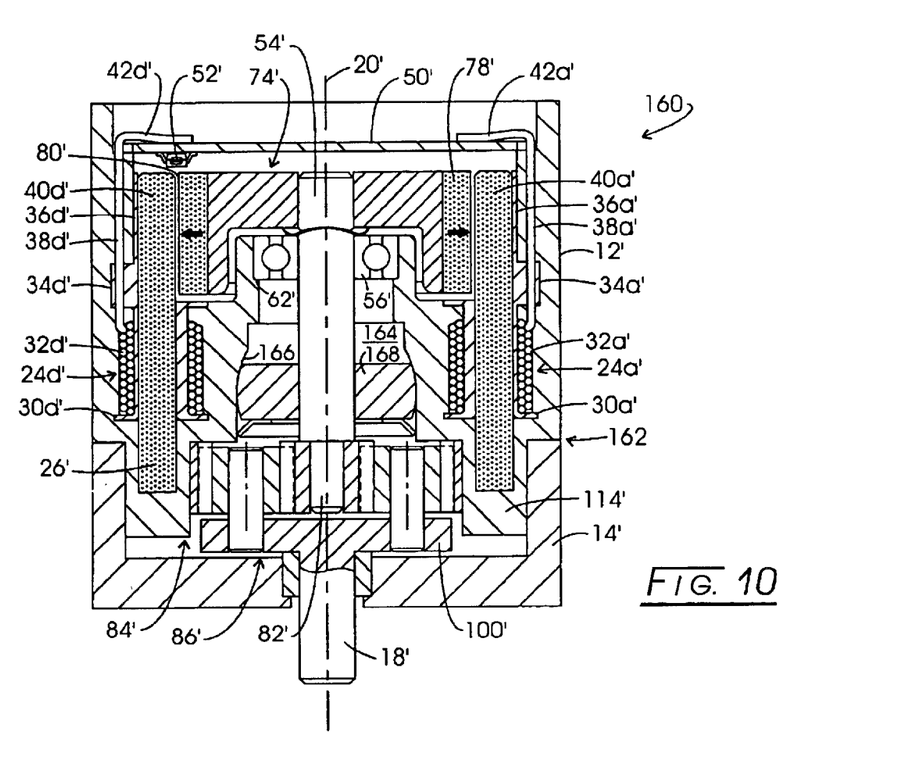
FIG. 10 is a sectional view similar to FIG. 2 but showing an implementation employing a self-aligning sleeve bearing.

Referring to FIG. 10 a modification of motor 10 is revealed in general at 160. This modification provides for the implementation of a self-aligning sleeve bearing in support of the drive shaft. Accordingly, where components are common with those identified in FIGS. 1–9 they are again identified with that numeration but in primed form. In this regard, stator backiron 26' is seen extending to upstanding stator cores as at 24*a*' and 24*d*' over which bobbins as at 30*a*' and 30*d*' are inserted in conjunction with core windings 32*a*' and 32*d*'. Shaft 54' is seen disposed about axis 20' and is mounted within upwardly disposed ball bearing 56' which is press fit into bearing mount 62'. Shaft 54' supports a rotor 74' having a rotor magnet 78', the outward face of which is spaced from the inwardly disposed face of core flux interaction regions, as at 40*a*' and 40*d*' to establish a working gap 80'. Shaft 54 extends to a necked down portion 82' which, in turn, is engaged with planetary gearhead 86'. Control platform 50' extends over the rotor region and carries flat terminals which electrically communicates with start and finish lead termini as at 42a' and 42d'. A commutational sensing device 52' is mounted on the underside of platform 50'. The plastic encapsulation structure now is represented in general at 162. While defining the same form of wall structure or case 12' and lower region 114', structure 162 exhibits a modified profile at its central opening region represented generally at 164 which defines a radially inwardly tapering bearing mount surface 166. Surface 166 has a curvature for supporting a self-aligning sleeve bearing. That self-aligning sleeve bearing is shown at 168 slidably mounted over drive shaft 54'. Bearing 168 is permitted to initially slightly rotate to effect its appropriate alignment with shaft 54'.

In the above-description the term "top" and "bottom" have been utilized, as well as the terms "upper" and "lower". These terms are arbitrary in the sense that they are utilized in the sense of the orientation of components in the figures. The terms should not be interpreted in a limiting sense. Similarly, the terms "locate", "shoot" and "shutting off" are terms commonly employed in the insertion molding or encapsulation arts and are not intended to be interpreted in a limiting sense.

Since certain changes may be made in the above-described apparatus and method without departing from the scope of the invention herein involved, it is intended that all matter contained in the above-description or shown in the accompanying drawings shall be interpreted as illustrative and not in a limiting sense.

What is claimed is:

1. Electrodynamic apparatus, comprising:
   a stator subassembly including a plurality of spaced apart stator core members configured as extending from a stator backiron, said stator cores and stator backiron being integrally formed of magnetically soft pressure shaped processed ferromagnetic particles which are generally insulatively associated, said stator core members and stator backiron being disposed about an axis, a plurality of stator windings extending about corresponding said stator core members at winding core portions and extending thereon to core flux interaction portions, and two or more winding leads extending from said plurality of stator windings to respective exit termini;
   an encapsulation structure formed around said stator subassembly of molded rigid injection moldable thermoplastic surrounding at least said stator windings and the space between said windings, having a central opening region disposed about said motor axis extending from a rotor operational region and configured having one or more shaft bearing mounts integrally formed therein and symmetrically disposed about said axis;
   one or more shaft bearings mounted upon corresponding said bearing mounts;
   a shaft mounted with said one or more shaft bearings for rotation about said axis and extending into said rotor operational region; and
   a rotor within said rotor operational region, mounted for rotation with said shaft and defining a working gap with said core flux interaction portions.

2. The electrodynamic apparatus of claim 1 in which:
   said encapsulation structure further comprises an integrally formed wall structure extending outwardly from said stator windings and axially above said core flux interaction portions to define a motor case.

3. The electrodynamic apparatus of claim 2 in which:
   said encapsulation structure further comprises a control platform support formed with said wall structure at a location axially above said core flux interaction portions; and further comprising:
   a control platform mounted upon said control platform support.

4. The electrodynamic apparatus of claim 3 in which:
   portions of said subassembly exit windings are supported with said integrally formed wall structure, and said exit termini are coupled to said control platform.

5. The electrodynamic apparatus of claim 2 in which:
   said stator subassembly core flux interaction portions are configured having radially outwardly disposed surfaces; and
   said encapsulation structure wall structure is configured to radially rearwardly support said core flux interaction portions radially outwardly disposed surfaces and to extend between the interstices thereof to provide lateral support.

6. The electrodynamic apparatus of claim 1 in which:
   said encapsulation structure is further configured to surround said stator backiron.

7. The electrodynamic apparatus of claim 1 in which:
   said electrodynamic apparatus is a motor;
   said encapsulation structure is configured having an integrally formed gearhead mount co-axially aligned with said central opening region;
   said shaft extends to said gearhead mount; and
   further comprising a gearhead coupled in driven relationship with said shaft and coupled in driving relationship with a motor output shaft.

8. The electrodynamic apparatus of claim 7 in which:
   said gearhead is a planetary gearhead configured with a sun gear mounted upon said shaft, a rotatable platform fixed with said output shaft and supporting more than one freely rotatable planet gears engaged with said sun gear and a ring gear; and
   said ring gear is integrally formed with said encapsulation structure gearhead mount.

9. The electrodynamic apparatus of claim 8 further comprising:
   a motor cap coupled with said encapsulation structure and supporting said output shaft for rotation.

10. The electrodynamic apparatus of claim 7 in which:
    said gearhead is a planetary gearhead configured with a sun gear mounted upon said shaft, a rotatable ring gear fixed with said output shaft and more than one planet gears mounted on shafts extending from said gearhead mount region.

11. The electrodynamic apparatus of claim 7 in which:
    said gearhead is a multi-stage planetary gearhead.

12. The electrodynamic apparatus of claim 1 in which:
    said stator subassembly stator windings are each wound about electrically insulative bobbins which are mounted over said stator core members at said winding core portions; and
    said exit winding leads extend axially along and spaced from said stator cores upwardly from and supported by said bobbins.

13. The electrodynamic apparatus of claim 1 in which:
    said encapsulation structure one or more bearing mounts includes a radially inwardly tapering bearing mount surface having a curvature for supporting a self aligning sleeve bearing; and further comprising a self aligning sleeve bearing positioned at said inwardly tapering bearing mount surface and supporting said shaft for rotation.

14. The method of assembling an electrodynamic apparatus, comprising the steps of:

(a) providing a stator subassembly including a plurality of spaced apart stator core members configured as extending from a stator backiron and disposed about an axis, a plurality of stator windings extending about corresponding stator cores at winding core portions and extending thereon to core flux interaction portions, and exit winding leads extending to respective exit termini;

(b) locating said stator subassembly within an insert mold tool die cavity radially aligned with respect to said axis and axially located;

(c) shutting off against the radially facing surfaces of said core flux interaction portions to define a rotor operational region;

(d) shutting off to define a central opening region disposed about said axis and extending from said rotor operational region and said tool being configured to define one or more bearing mounts symmetrically disposed about said axis;

(e) shutting off against said exit winding leads or said exit termini;

(f) injecting plastic within said die cavity to form an encapsulation structure;

(g) pulling apart said insert mold tool to provide a plastic encapsulation structure in structurally supporting association with said stator subassembly;

(h) positioning one or more bearings within said one or more bearing mounts;

(i) providing a rotor and drive shaft;

(j) positioning said rotor at said rotor operational region and said drive shaft within said one or more bearings; and (k) coupling said exit lead termini with a circuit.

15. The method of claim 14 in which:

said step (c) further comprises the step:

(c1) shutting off to define a control platform support located axially outwardly from said rotor operational region; and said step (k) further comprises the step;

(k1) mounting a control platform supporting said circuit upon said control platform support.

16. The method of claim 14 in which:

said steps (c) and (e) comprises the step of inserting a removable insert into the said core flux interaction region and said exit winding leads region to provide shut off against said radially facing surfaces of said core flux interaction portions and said exit winding leads said removable insert being located along the axis of said mold tool die cavity.

17. The method of claim 14 in which:

said electrodynamic apparatus is a motor;

said step (d) further comprises the step: (d1) shutting off to define a gearhead mount co-axially aligned with said central opening region;

further comprising the step:

(l) mounting a gearhead within said gearhead mount in driven relationship with said drive shaft, said gearhead being coupled in driving relationship with an axially outwardly extending output shaft.

18. The method of claim 17 in which:

said step (l) further comprises the step (l1) providing said gearhead as a planetary gearhead configured with a sun gear mounted upon said drive shaft, a rotatable platform fixed to said output shaft and supporting more than one freely rotatable planet gears engaged with said sun gear and engagable with a ring gear; and said step (d1) defines said ring gear as being integrally formed within said gearhead mount.

19. The method of claim 17 in which:

said step (l) further comprises the step (l2) providing said gearhead as a planetary gearhead configured with a sun gear mounted upon said drive shaft, a rotatable ring gear fixed to said output shaft and more than one planet gears mounted on shafts extending from said gear head mount region.

20. The method of claim 17 further comprising the steps:

(l) providing a motor cap having a cap bearing configured for receiving said output shaft; and (m) mounting said motor cap over said gear mount, said cap bearing supporting said output shaft for rotation.

21. The method of claim 14 in which:

said step (a) provides said stator subassembly stator cores and stator backiron as being integrally formed of magnetically soft pressure shaped processed ferromagnetic particles which are generally mutually insulatively associated.

22. The method of claim 14 in which:

said step (d) defines said one or more bearing mounts as having a radially inwardly tapering bearing mount surface having a curvature for supporting a self aligning sleeve bearing; and said step (h) positions said one or more bearings as a self aligning sleeve bearing.

23. An encapsulated wound stator assembly having an axis and employable with an electrodynamic apparatus, comprising:

an upstanding stator formed of magnetically soft pressed processed ferromagnetic particles that comprises a stator backiron region, a stator wire winding region and a stator flux interaction region;

a winding assembly mounted over said upstanding stator at said wire winding region and having at least two wires or wire extensions exiting said winding assembly;

a thermoplastic encapsulation structure formed around said upstanding stator wire winding assembly except for a rotor region radially confronting said stator flux interaction region, said at least two wires or wire extensions exiting said encapsulation structure, said encapsulation structure having a central opening region disposed about said axis formed to define a bearing mount or bearing assembly mount.

24. The wound stator assembly of claim 23 in which:

said encapsulation structure further comprises a region of gear teeth disposed about said axis.

25. The encapsulated wound stator assembly of claim 24 in which:

said gear teeth are located at least substantially within said upstanding stator.

* * * * *